(12) United States Patent
Valen et al.

(10) Patent No.: US 10,730,228 B2
(45) Date of Patent: Aug. 4, 2020

(54) MICROTOPOGRAPHIC PATTERN TRANSFER TOOL

(71) Applicants: Andrew W. Valen, Hollis Hills, NY (US); Maurice Valen, Jamaica, NY (US)

(72) Inventors: Andrew W. Valen, Hollis Hills, NY (US); Maurice Valen, Jamaica, NY (US)

(*) Notice: Subject to any disclaimer, the term of this patent is extended or adjusted under 35 U.S.C. 154(b) by 244 days.

(21) Appl. No.: 15/492,609

(22) Filed: Apr. 20, 2017

(65) Prior Publication Data

US 2017/0305063 A1 Oct. 26, 2017

Related U.S. Application Data

(60) Provisional application No. 62/325,673, filed on Apr. 21, 2016.

(51) Int. Cl.
*B29C 59/04* (2006.01)
*B29C 33/38* (2006.01)
*B29C 33/42* (2006.01)
*B29C 33/34* (2006.01)
*B41K 5/00* (2006.01)
(Continued)

(52) U.S. Cl.
CPC .............. *B29C 59/04* (2013.01); *B29C 33/34* (2013.01); *B29C 33/38* (2013.01); *B29C 33/424* (2013.01); *B29C 59/02* (2013.01); *B41K 5/006* (2013.01); *B44B 5/0085* (2013.01); *B44B 5/022* (2013.01); *B29C 2033/426* (2013.01);
(Continued)

(58) Field of Classification Search
CPC ......... B29C 59/04; B29C 59/02; B29C 33/34; B29C 33/424; B29C 33/38; B29C 2059/023; B29C 2033/426; B29L 2031/755; B29L 2031/7532; B29K 2905/08; B41J 3/39; B41K 5/006; B44B 5/026; B44B 5/0085; B44B 5/022
See application file for complete search history.

(56) References Cited

U.S. PATENT DOCUMENTS 1,576,477 A * 3/1926 Wiens ................. G03B 42/042
378/168
5,588,832 A * 12/1996 Farzin-Nia ............... A61C 7/04
433/4
(Continued)

OTHER PUBLICATIONS

Li, Song et al., "Effects of morphological patterning on endothelial cell migration", Endothelial cell migration, IOS Press, Biorheology 38, Feb. 2001, pp. 101-108.
Curtis, Adam et al., "Topographical control of cells", Review, Biomaterials, vol. 18, No. 24, 1997, pp. 1573-1583. Doyle, Andrew D. et al., "One-dimensional topography underlies three-dimensional fibrillar cell migration", JCB: Report, J. Cell Biol., vol. 184, No. 4, pp. 481-490.
(Continued)

*Primary Examiner* — Michael M. Robinson
(74) *Attorney, Agent, or Firm* — Maxine L. Barasch; Keohane & D'Alessandro, PLLC

(57) ABSTRACT

A hand-operated tool for embossing a membrane or other soft pliable implant with microgrooves or microgeometries is disclosed. The tool includes an embossing surface such as a pressure plate or roller that includes a specific microgroove or microtopographical pattern. This allows a user such as a clinician to create an embossed surface on a membrane or other implantable device at the time of surgery for the purposes of directing cellular orientation and migration, increasing cell migration velocity and enhancing re-epithelialization rates in various medical and dental applications.

13 Claims, 10 Drawing Sheets

(51) Int. Cl.
*B29C 59/02* (2006.01)
*B29L 31/00* (2006.01)
*B44B 5/02* (2006.01)
*B44B 5/00* (2006.01)

(52) U.S. Cl.
CPC .... *B29C 2059/023* (2013.01); *B29K 2905/08* (2013.01); *B29L 2031/755* (2013.01); *B29L 2031/7532* (2013.01)

(56) References Cited

U.S. PATENT DOCUMENTS

| | | | |
|---|---|---|---|
| 6,293,790 B1* | 9/2001 | Hilliard | A61C 7/04 101/3.1 |
| 2008/0210109 A1* | 9/2008 | Joyce | B29C 59/022 100/295 |
| 2017/0008333 A1* | 1/2017 | Mason | B44C 1/28 |

OTHER PUBLICATIONS

Smith, Patricio C. et al., "Wound Healing in the Oral Mucosa", Oral Mucosa in Health and Disease, 2018, pp. 77-90.
Ricci, J. L., et al. (2008). "Connective-tissue responses to defined biomaterial surfaces. I. Growth of rat fibroblast and bone marrow cell colonies on microgrooved substrates." J Biomed Mater Res A 85(2): 313-325.
Marmaras, A., et al. (2012). "Topography-mediated apical guidance in epidermal wound healing." Soft Matter 8(26): 6922.
Magin, C. M., et al. (2016). "Evaluation of a bilayered, micropatterned hydrogel dressing for full-thickness wound healing." Exp Biol Med (Maywood) 241(9): 986-995.
Jeon, H., et al. (2010). "The effect of micronscale anisotropic cross patterns on fibroblast migration." Biomaterials 31 (15): 4286-4295.
Nikkhah, M., et al. (2012). "Engineering microscale topographies to control the cell-substrate interface." Biomaterials 33(21): 5230-5246.

* cited by examiner

MICROTOPOGRAPHIC PATTERN TRANSFER TOOL

CROSS-REFERENCE TO RELATED APPLICATION

The present patent document claims priority to U.S. provisional patent application Ser. No. 62/325,673, filed Apr. 21, 2016, titled "MICROGROOVED PATTERN TRANSFER TOOL", the disclosure of which is incorporated herein by reference.

FIELD OF THE INVENTION

The present invention relates generally to medical tools, and more particularly, to a microgrooved or microtopographic pattern transfer tool.

BACKGROUND

Numerous biophysical and structural factors contribute to the host response to implantable biomaterials including material composition, mechanical properties, molecular landscape, ability to resist infection, proper surgical use and, importantly, surface topography. Surface topography is a key aspect regulating the tissue-implant interface and is increasingly being recognized as an important factor to control the response of cells to biomaterials such as natural or artificial membranes, short term and long term implants and other medical devices. Evidence has shown that multiple grooved surfaces of various dimensions and geometries exert topographical control over the behavior of cells interacting with that surface. The interaction and response of cells to these topographies are mediated through a phenomenon called contact guidance. The impact of surface topography on cellular function has been recognized and demonstrated to be capable of orienting cell migration and differentiation in a manner that would aid in guided tissue repair. This topographical control has numerous well researched benefits including enhanced re-epithelialization rates, directed cellular orientation and migration and increased cell migration speed/velocity in addition to other benefits.

Various fabrication techniques are known in the art for producing microstructured topographies. For example, random microtopographies have been added to implant surfaces through various well known methods including sandblasting, acid etching, machining, grinding, abrasion and plasma spraying. While these surface modifications have important benefits, the resulting topography is structured randomly. In contrast, microfabrication techniques have been shown to produce regular and repeating ordered structures such as microgrooves and pillars. The introduction of these microfabrication techniques have made it possible to regulate cell to cell and cell to substrate interactions in laboratory experiments as well as on medical devices.

The earliest of these microfabrication techniques was photolithography, and the art has since evolved with more complicated techniques including chemical etching, deep reactive ion etching and reactive ion etching, stereolithography, two photon absorption lithography, and laser ablation, among others. Typically, these microfabrication techniques are expensive, time consuming and cannot be performed by a clinician at the time of surgical implantation.

Many soft and pliable medical devices are currently used in medical and dental applications, particularly in guided bone regeneration (GBR) and guided tissue regeneration (GTR) procedures performed by dentists in the form of membranes. These soft barrier membranes are composed of one or more of at least a dozen different types of biomaterials, and can be natural and resorbable (composed of collagen, chitosan, gelatin, etc.), synthetic and resorbable (composed of Ploylactic acid, polylactic/polyglycolic acid, other polymer composites, etc.), or synthetic and non-resorbable (most often composed of polytetrafluoroethylene). The theory of GTR and GBR is predicated on the migration of pluripotential and osteogenic cells from the periosteum and adjacent alveolar bone to the defect site while at the same time excluding epithelial cells and fibroblasts from infiltrating and potentially disrupting new bone formation. In this way, wound healing can be described as a race between a variety of cells to the healing site. The purpose of an occlusive membrane barrier is to keep epithelial cells and fibroblasts on the soft tissue side of the membrane, which enables the healing wound region on the bone side of the membrane to be populated by cells that are more favorable for bone regeneration. There currently exists a need for a hand operated tool that would allow a clinician to emboss a membrane or other soft pliable implant with a microtopography that would orient and direct the migration of these epithelial cells and fibroblasts in manners that would be more conducive to wound healing.

SUMMARY

Embodiments provide a hand-operated tool for embossing a membrane or other soft pliable implant with microgrooves or microtopographies is disclosed. The tool includes an embossing surface such as a pressure plate or roller that includes a specific microgroove or microtopographical pattern. This allows a user such as a clinician in his/her office at the time of surgery to create an embossed surface on a membrane or other implantable device for the purposes of directing cellular orientation and migration, increasing cell migration velocity and enhancing re-epithelialization rates in various medical and dental applications.

A first aspect of embodiments provide a manually-operated autoclavable tool for embossing an implantable material, comprising: a first elongated member; a second elongated member pivotally connected to the first elongated member; a first pressure plate disposed on a distal end of the first elongated member; a second pressure plate disposed on a distal end of the second elongated member, wherein the first pressure plate comprises a surface comprising a plurality of microgrooves or microtopographies, wherein each of the plurality of microgrooves has a height between approximately 0.05 micron and 200 microns, wherein each of the plurality of microgrooves has a width between approximately 0.05 micron and 200 microns, and wherein a pitch of the plurality of microgrooves is between approximately. 0.05 micron and 200 microns.

Another aspect of embodiments provide a manually-operated tool for embossing an implantable material, comprising: a handle portion; a pressure plate disposed on a distal end of the handle portion; wherein the pressure plate comprises a surface comprising plurality of microgrooves, wherein each of the plurality of microgrooves has a height between approximately 0.05 micron and 200 microns, wherein each of the plurality of microgrooves has a width between approximately 0.05 micron and 200 microns, and wherein a pitch of the plurality of microgrooves is between approximately. 0.05 micron and 200 microns.

Yet another aspect of embodiments provide a manually-operated tool for embossing an implantable material, comprising:

a handle portion; a bracket disposed on a distal end of the handle portion; a roller rotatably affixed to the bracket; wherein an outer surface of the roller comprises a plurality of microgrooves, wherein each of the plurality of microgrooves has a height between approximately 0.05 micron and 200 microns, wherein each of the plurality of microgrooves has a width between approximately 0.05 micron and 200 microns, and wherein a pitch of the plurality of microgrooves is between approximately. 0.05 micron and 200 microns.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Figure 1:
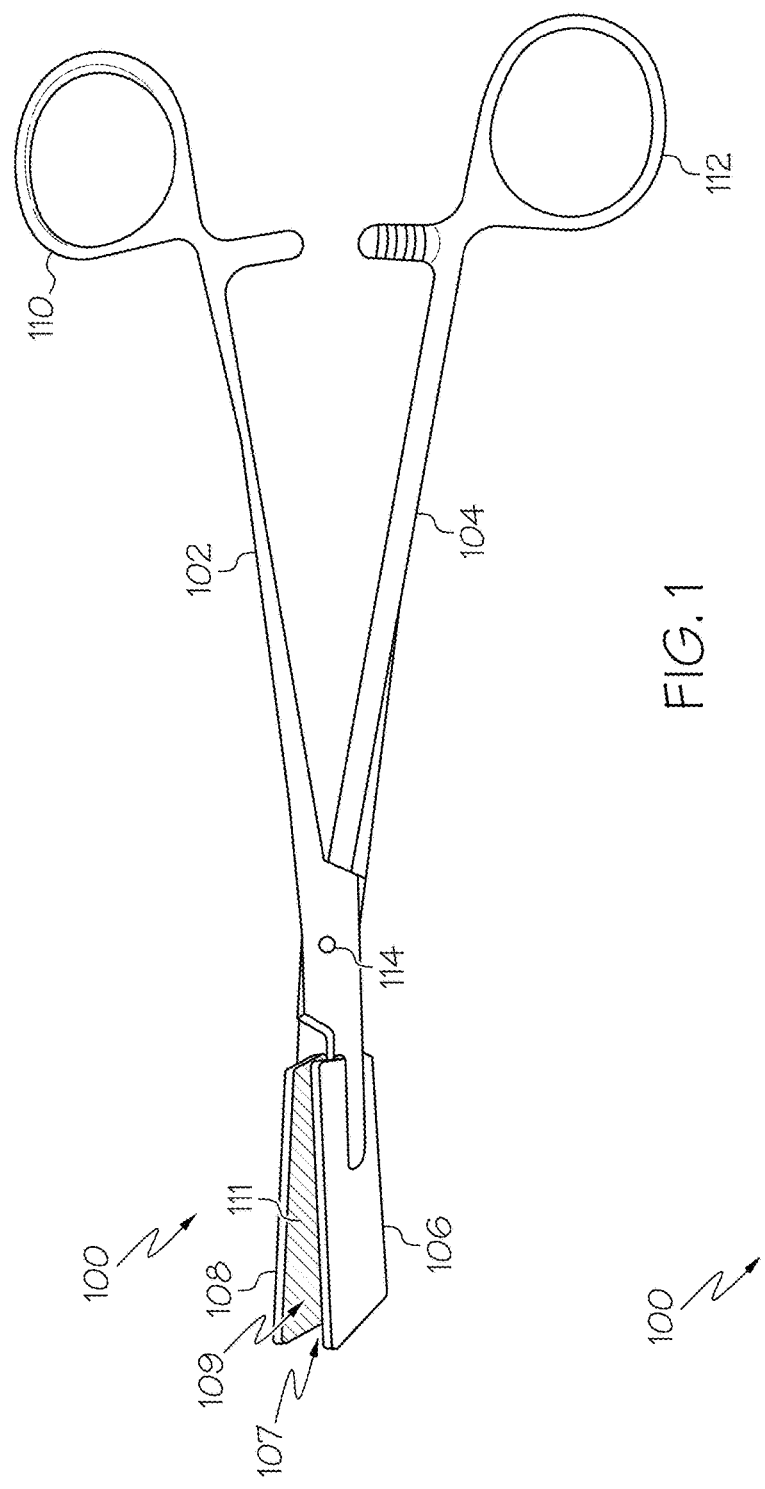
FIG. 1 shows a side view of a manually-operated tool for embossing a membrane in accordance with an embodiment of the present invention.

Disclosed embodiments provide a tool for embossing a microgroove or microtopographic pattern onto a substrate, including a membrane, or other soft implantable material or device. The manually-operated tool allows a clinical practitioner (dentist, physician, dental assistant, etc.) to transfer, i.e. emboss or imprint, a microgrooved or microtopographic pattern directly into a soft and pliable implant (membrane, etc.) in his/her office at the time of surgery. Examples of soft and pliable implants include those constructed of polytetrafluoroethylene (PTFE), other synthetic polymers (Polylactic acid, polyglycollic acid, or combinations thereof, etc.) or implants made of natural materials like bovine or porcine collagen. The primary function of the tool is to use manual or mechanical force to compress a single plate or multiple plates (or other surfaces) with a microgrooved pattern into the surface of a soft and pliable implant. This compression forms the microgrooves or other microtopographies directly into the implant prior to implantation in a patient.

Barrier membranes are widely used in the medical field and may have various random or ordered microtopographies. In each of these cases, however, the microtopography has been produced during the manufacturing process and is available to the clinician in a finished and sterilized package, often at a high cost. Production usually includes the addition of the micro surfaces to the implant in a lab or manufacturing facility using complex and expensive equipment and methods. The methods and equipment include, for example, lasers, photoetching, reactive ion etching or lithography (collectively referred to as "microfabrication"). These methods are expensive and cannot be done by a clinician in his/her office during a surgical procedure. Accordingly, the need exists for an effective and autoclavable tool that would allow a clinician, in his/her office at the time of surgery, to emboss specific microgeometries onto an implantable membrane that are favorable to wound healing. Embodiments of the present invention meet this need. Embodiments of the present invention are manually operated, small enough to fit into a typical autoclave or other sterilization machine in a dental or medical office, and configured for quick use in the medical or dental office (as opposed to a laboratory, or manufacturing facility). When channels or other microtopographies are added to a soft and pliable membrane using the tool, cell migration can be preferentially oriented along microgrooves in a manner that would aid in guided tissue repair by increasing cell migration velocity and enhancing re-epithelialization rates resulting in faster tissue coverage and faster healing, which may result in reduced medical costs and increased patient/clinician satisfaction.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

Figure 1B:
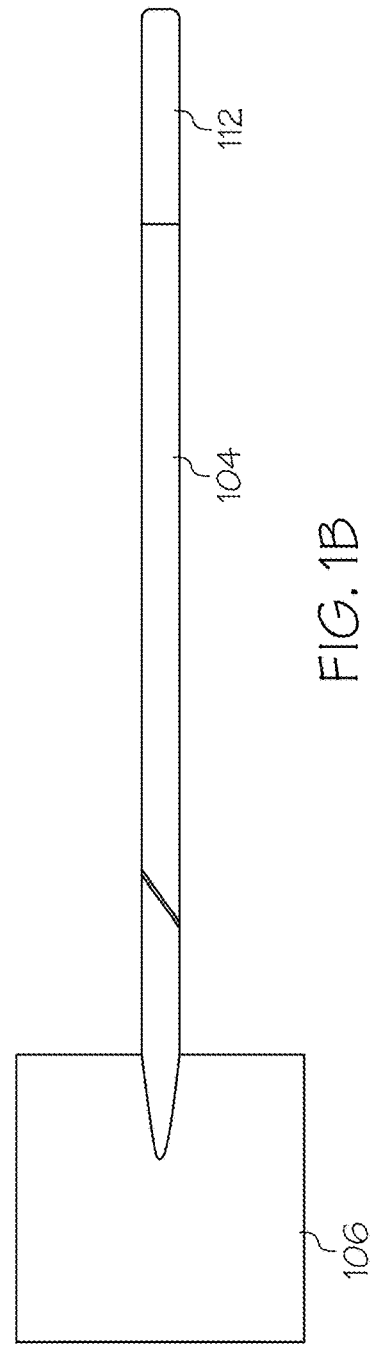
FIG. 1B shows a top-down view of the tool of FIG. 1.

FIG. 1 shows a side view of a manually-operated tool 100 for embossing a substrate in accordance with an embodiment of the present invention. FIG. 1B shows a top-down view of tool 100. Tool 100 comprises a first elongated member 102 and a second elongated member 104 pivotally connected to the first elongated member at pivot joint 114. A first pressure plate 106 is disposed on a distal end of the first elongated member 102. A second pressure plate 108 is disposed on a distal end of the second elongated member 104. The first pressure plate 106 may comprise a surface 107 including a plurality of microgrooves, and the second pressure plate 108 may have a smooth surface. Alternatively, in some embodiments, surface 109 of the second pressure plate 107 may include the plurality of microgrooves rather than surface 107 of pressure plate 108. In embodiments, each microgroove of the plurality of microgrooves has a width ranging from approximately 0.05 micron (50 nanometers) to approximately 50 microns, and each microgroove of the plurality of microgrooves has a depth (i.e. height) ranging from approximately 0.05 microns to approximately 50 microns. It should be recognized that the term "microgrooves", as used herein, incorporates grooves or other topographics having dimensions on a micro-scale or nanoscale.

In some embodiments, the surface 107 of first pressure plate 106 and the surface 109 of second pressure plate 108 each include a plurality of microgrooves. An example microgroove is pointed out by reference number 111. The microgrooves are shown here for clarity, but in implementation, the microgrooves are too small to be seen by the naked eye. Each microgroove of the plurality of microgrooves has a width ranging from approximately 0.05 microns to approximately 50 microns, and where each microgroove of the plurality of microgrooves has a depth (i.e. height) ranging from approximately 0.05 microns to 50 microns. In this way, both sides of a substrate or substrate can be imprinted with microgrooves using a single application of the tool. In some cases, it may be desirable by the clinician to have a first pattern (as defined by various parameters/geometries) on a first side of the substrate and a second pattern (as defined by various parameters/geometries) on the second side of the substrate. For example, the clinician may desire a first pattern on a first side of the substrate (e.g., membrane or implantable material) for inducing cell migration, preferentially oriented along microgrooves in a manner that would aid in soft tissue repair, and a second pattern on the second side of the substrate that would induce migration of cells favorable for bone growth and repair. A two-plate embodiment would facilitate this.

In some embodiments, there is a first finger loop 110 disposed on the first elongated member 102 and a second finger loop 112 disposed on the second elongated member 104. The finger loops allow the tool 100 to be operated in a manner similar to a scissors. During use of tool 100, an implantable material is positioned in between the surface 107 and surface 109 of the first pressure plate 106 and the second pressure plate 108, respectively. When the user squeezes the first finger loop 110 and the second finger loop 112 together, the first pressure plate 106 and the second pressure plate 108 squeeze together to put pressure on the implantable material, thereby embossing to the implantable material any microtopography from one or both pressure plates.

Figure 2A:
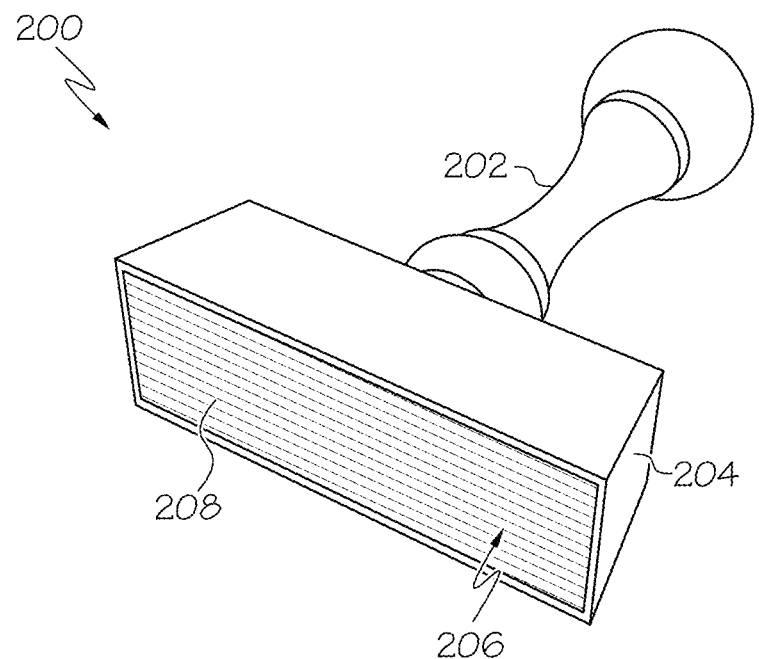
FIG. 2A shows a perspective view of a manually-operated tool for embossing a membrane in accordance with another embodiment of the present invention.
Figure 2B:
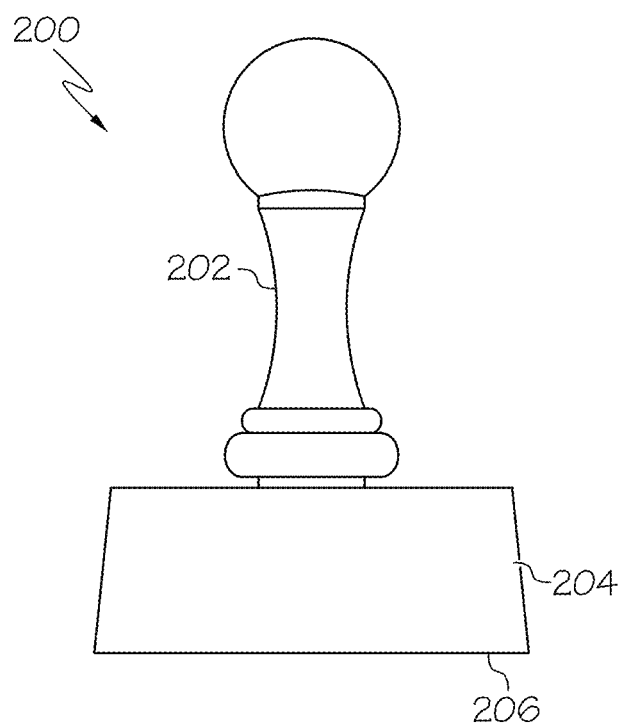
FIG. 2B shows a front view of the tool of FIG. 2A.
Figure 2C:
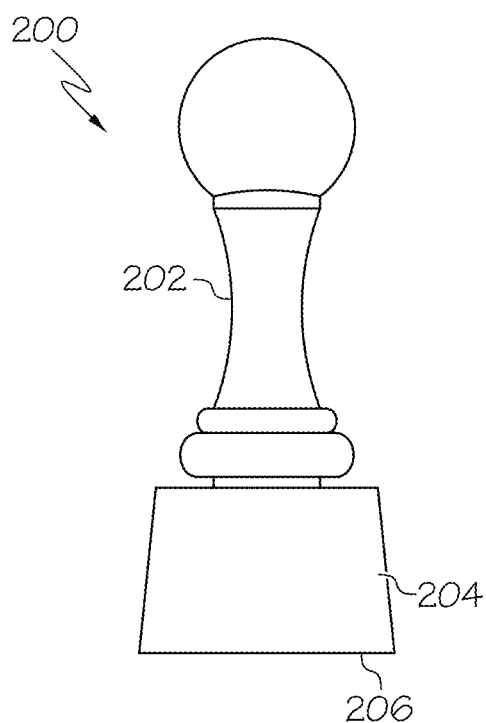
FIG. 2C shows a side view of the tool of FIG. 2A.

FIG. 2 shows a perspective view of a manually-operated tool 200 for embossing a substrate in accordance with another embodiment of the present invention. FIG. 2B shows a front view of tool 200, and FIG. 2C shows a side view of tool 200. Tool 200 comprises an elongated handle portion 202. A pressure plate 204 is disposed on a distal end of the handle portion 202. The surface 206 of the pressure plate comprises a plurality of microgrooves, an example of which is labeled 208 in FIG. 2A. The microgrooves are shown here for clarity, but in implementation, the microgrooves are too small to be seen by the naked eye. In embodiments each microgroove of the plurality of microgrooves has a width ranging from approximately 0.05 microns to approximately 50 microns, and each microgroove of the plurality of microgrooves has a depth (i.e. height) ranging from approximately 0.05 microns to approximately 50 microns.

During use of tool 200, an implantable material is positioned on a surface such as a sterile plate. The user positions surface 206 of pressure plate 204 over the implantable material, and presses down on the handle 202, creating pressure to emboss the microtopography from the surface 206 to the implantable material.

Figure 3A:
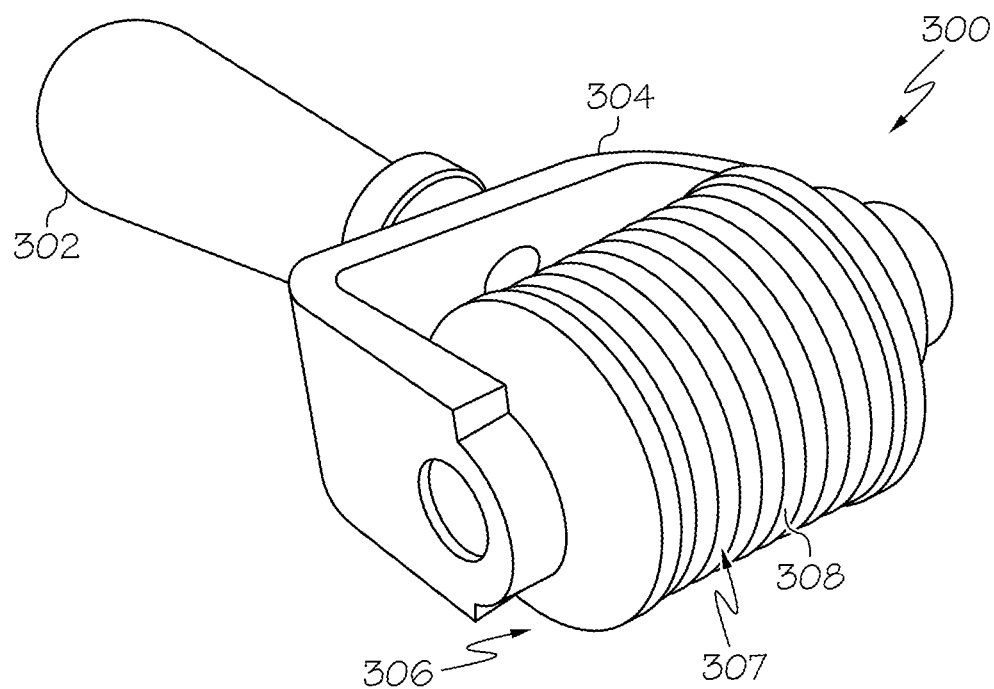
FIG. 3A shows a side perspective view of a hand-operated tool 300 for embossing a membrane in accordance with another embodiment of the present invention.
Figure 3B:
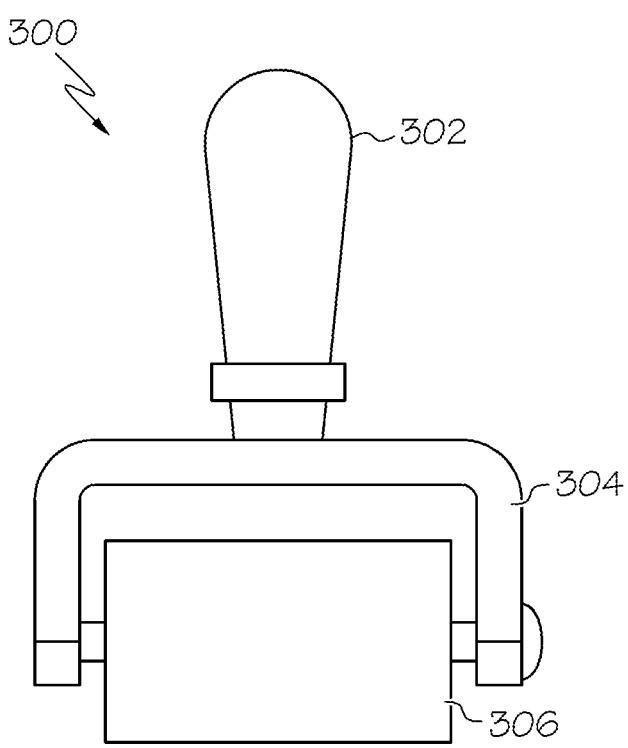
FIG. 3B shows a front view of the tool of FIG. 3A.
Figure 3C:
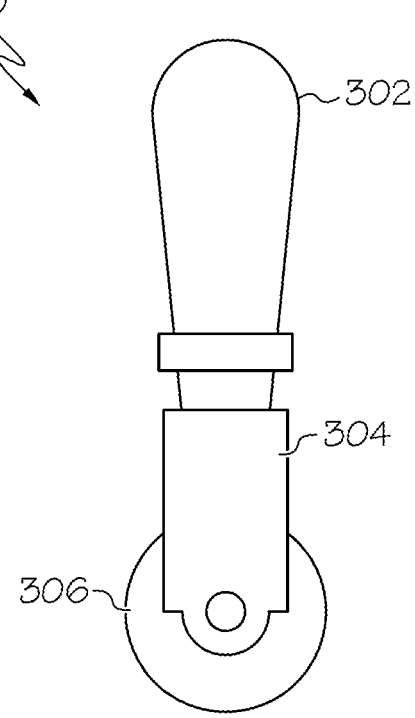
FIG. 3C shows a side view of tool of FIG. 3A.

FIG. 3A shows a side perspective view of a hand-operated tool 300 for embossing a substrate in accordance with another embodiment of the present invention. FIG. 3B shows a front view of tool 300, and FIG. 3C shows a side view of tool 300. The tool 300 comprises a handle portion 302. A bracket 304 is disposed on a distal end of the handle portion 302. A roller 306 is rotatably affixed to the bracket 304. The cylindrical outer surface 307 of the roller 306 comprises a plurality of microgrooves, an example of which is pointed out at 308. The microgrooves are shown here for clarity, but in implementation, the microgrooves are too small to be seen by the naked eye. Each microgroove of the plurality of microgrooves has a width ranging from approximately 0.05 microns to approximately 50 microns, and where each microgroove of the plurality of microgrooves has a depth (i.e. height) ranging from approximately 0.05 micron to approximately 50 microns.

During use of tool 300, an implantable material is positioned on a surface such as a sterile plate. The user positions surface 307 of roller 306 over the implantable material, and presses down on the handle 302 and rolls the roller 306 over the implantable material. This creates pressure to emboss the microtopography from the surface 307 to the implantable material.

Figure 4A:
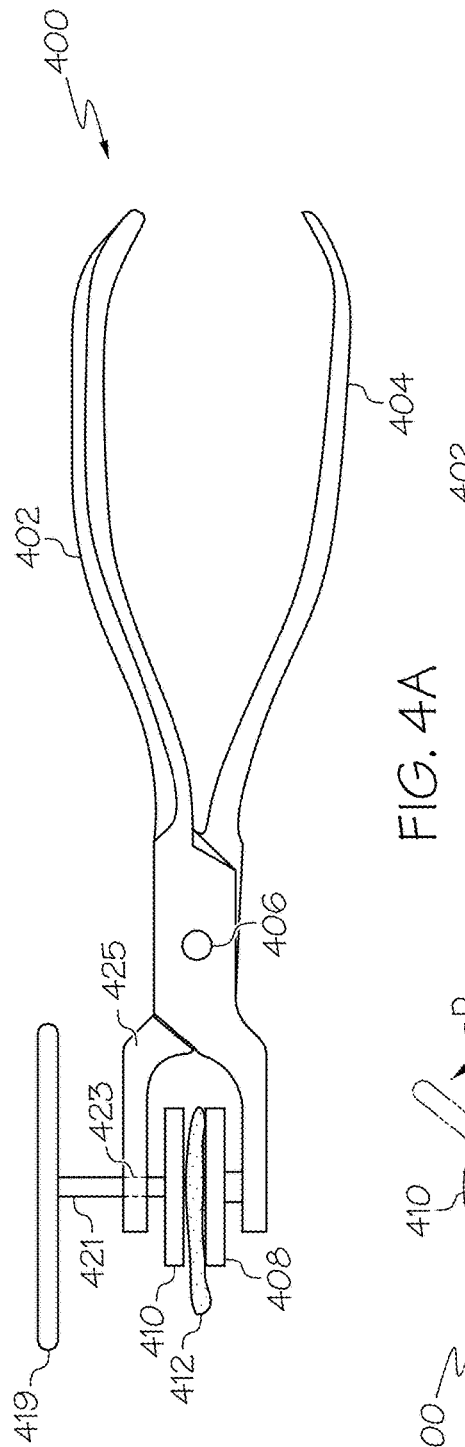
FIG. 4A shows a side view of a manually-operated tool for embossing a membrane in accordance with another embodiment of the present invention.
Figure 4B:
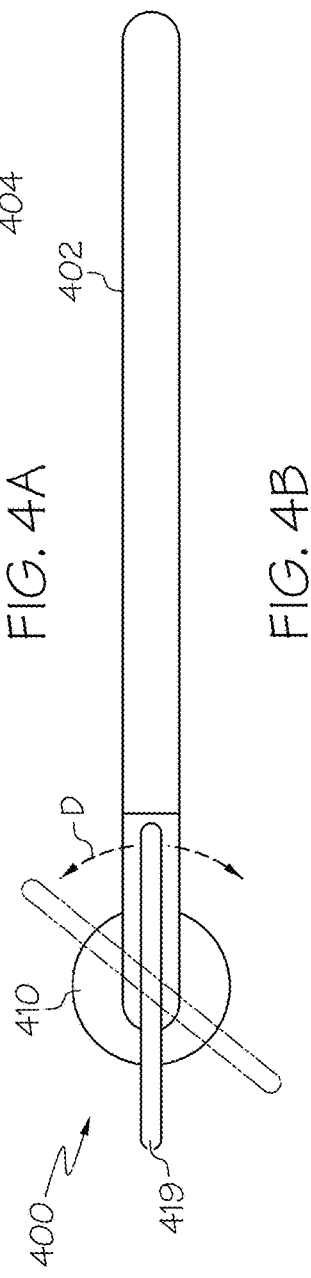
FIG. 4B shows a top-down view of the tool of FIG. 4A.
Figure 4C:
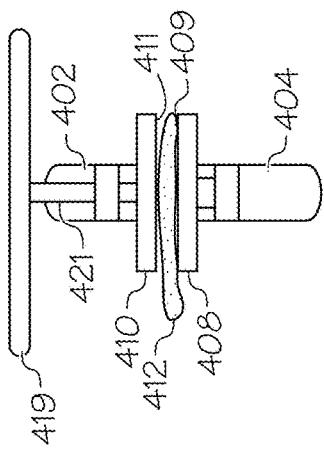
FIG. 4C shows a front view of the tool of FIG. 4A.

FIG. 4A shows a side view of a manually-operated tool 400 for embossing a substrate in accordance with another embodiment of the present invention. FIG. 4B shows a top-down view of tool 400, and FIG. 4C shows a front view of tool 400. Tool 400 comprises a first elongated member 402 and a second elongated member 404 pivotally connected to the first elongated member at pivot joint 406. A first pressure plate 408 is disposed on a distal end of the first elongated member 402. A second pressure plate 410 is disposed on a distal end of the second elongated member 404. Pressure plate 410 comprises a surface 411 including plurality of microgrooves. In some embodiments, pressure plate 408 comprises a surface 409 including plurality of microgrooves. In some embodiments, each microgroove of the plurality of microgrooves has a width ranging from approximately 0.05 microns to approximately 50 microns, and each microgroove of the plurality of microgrooves has a depth (i.e. height) ranging from approximately 0.05 microns to approximately 50 microns.

In embodiments, tool 400 includes T-handle 419 which is mechanically attached to threaded shaft 421, which engages through a threaded hole 423 in prong 425. The distal end of threaded shaft 421 is mechanically coupled to pressure plate 410. In use, the user can turn the T-handle 419 in the direction as indicated by arrow D in FIG. 4B in order to adjust the gap between pressure plate 410 and pressure plate 408 to accommodate different types and amounts of implantable material (substrate) 412.

In some embodiments, the pressure plate 408 also comprises a surface including a plurality of microgrooves, where each microgroove of the plurality of microgrooves has a width ranging from approximately 0.05 microns to approximately 50 microns, and where each microgroove of the plurality of microgrooves has a depth (i.e. height) ranging from approximately 0.05 microns to approximately 50 microns. In this way, both sides of a substrate can be imprinted with microgrooves using a single application of the tool. In some cases, it may be desirable by the clinician to have a first pattern (as defined by various parameters/geometries) on a first side of the substrate and a second pattern (as defined by various parameters/geometries) on the second side of the substrate. For example, the clinician may desire a first pattern on a first side of the substrate for inducing cell migration, preferentially oriented along microgrooves in a manner that would aid in soft tissue repair, and a second pattern on the second side of the substrate that would induce migration of cells favorable for bone growth and repair. A two-plate embodiment would facilitate this.

The elongated members 402 and 404 may be formed in a curved shape resembling a pliers tool to facilitate easy gripping and squeezing to form the microgroove pattern in a substrate by squeezing the first elongated member 402 and second elongated member 404 so that the pressure plates 408 and 410 engage with, and form microgrooves in the substrate 412.

Figure 5A:
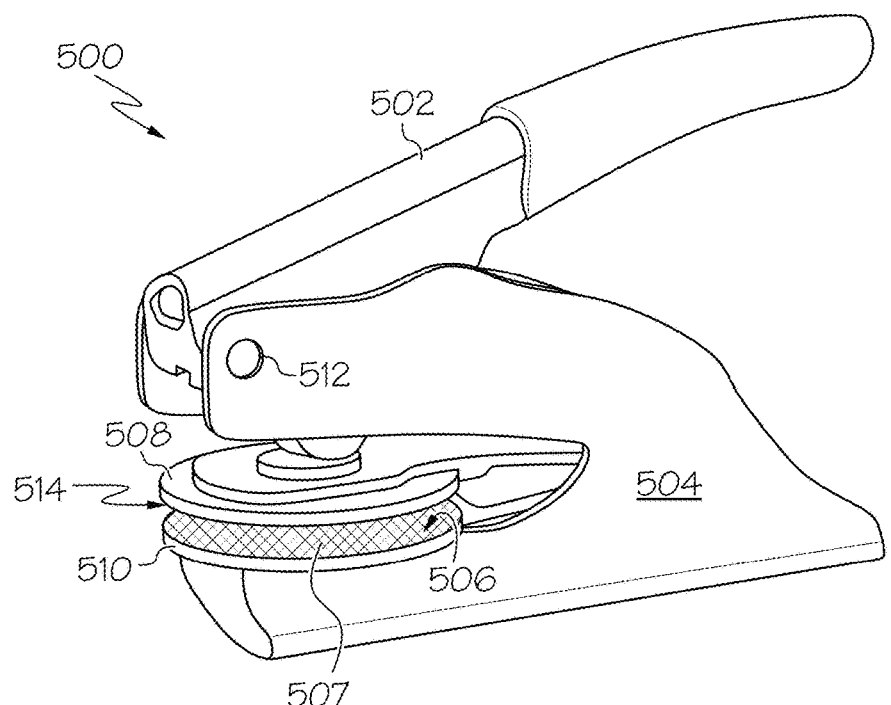
FIG. 5A shows a side-perspective view of a manually-operated tool for embossing a membrane in accordance with another embodiment of the present invention.
Figure 5B:
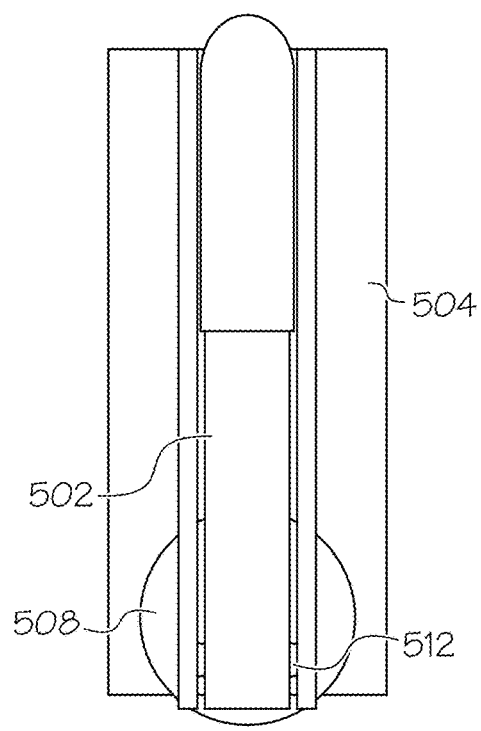
FIG. 5B shows a top-down view of the tool of FIG. 5A.
Figure 5C:
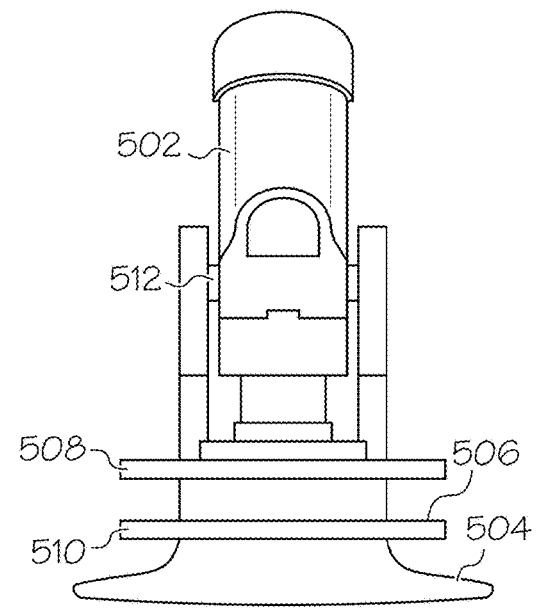
FIG. 5C shows a front view of the tool of FIG. 5A.

FIG. 5A shows a side-perspective view of a manually-operated tool 500 for embossing a substrate in accordance with another embodiment of the present invention. FIG. 5B shows a top-down view of tool 500, and FIG. 5C shows a front view of tool 500. Tool 500 comprises a base 504. A lever 502 is rotatably attached to the base 504 via pivot joint 512. A first pressure plate 510 has a surface 506 with microgrooves, an example which is pointed out at 507, thereon. The microgrooves are shown here for clarity, but in implementation, the microgrooves are too small to be seen by the naked eye. A second pressure plate 508 is mechanically coupled to the lever 502, such that the second pressure plate 508 moves towards the first pressure plate 510 when a downward force is applied to lever 502. In use, an implantable material would be placed between the two plates. When a user presses the lever 502, the second pressure plate 508 would place pressure on the implantable material, thereby embossing the implantable material with by the microgrooves.

In some embodiments, rather than the first pressure plate 510 having the microgrooves on surface 506, the second pressure plate may instead have the microgrooves on its surface 514. Accordingly, in such an embodiment, pressure plate 510 would have a smooth surface.

Optionally, both the surface 506 of first pressure plate 510 and the surface 514 of the second pressure plate 508 may each have a microgroove pattern. In this way, both sides of a substrate can be imprinted with microgrooves using a single application of the tool. This has the same benefits of double plates as described with respect to tools 100 and 400.

Accordingly, in embodiments of the invention, microgrooves may be included on one the surface of a single pressure plate or both pressure plates. In embodiments, when microgrooves are only on one pressure plate, the other pressure plate surface is substantially smooth.

FIGS. 6A-6F show exemplary microgroove patterns in accordance with embodiments of the present invention. Note that representations of the microgrooves are shown, and in implementations, the microgrooves are too small to be seen by the naked eye. Example patterns include concentric circles, radial designs, radiating fans, parallel lines, intersecting parallel lines, or some combination thereof.

Figure 6A:
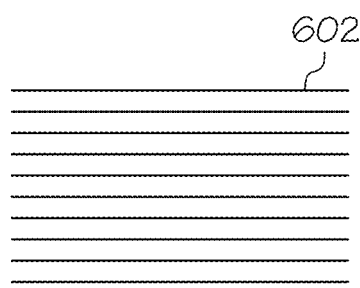
FIG. 6A shows an exemplary microgroove pattern in accordance with embodiments of the present invention.

FIG. 6A shows microgrooves arranged in a pattern of parallel lines, indicated generally as 602. Note that the pitch between the lines does not have to be equal. For example, there may be a section where the parallel lines are 12 microns apart, and then a separate section where they are 8 microns apart.

Figure 6D:
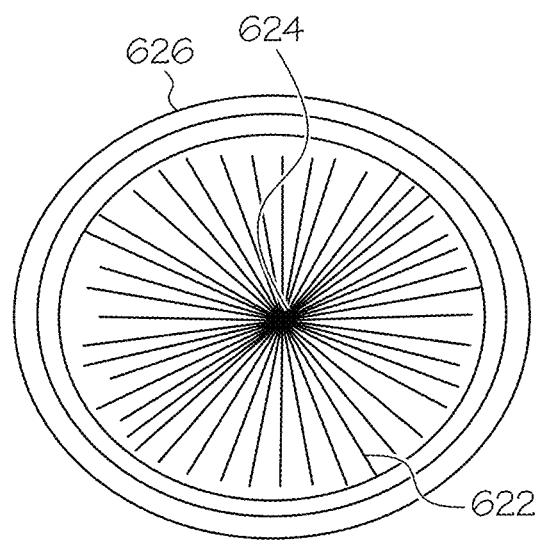
FIG. 6D shows an exemplary microgroove pattern in accordance with embodiments of the present invention.
Figure 6B:
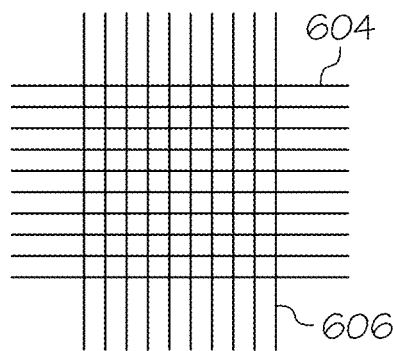
FIG. 6B shows an exemplary microgroove pattern in accordance with embodiments of the present invention.

FIG. 6B shows microgrooves arranged in a pattern of intersecting parallel lines. A first set of parallel lines is indicated generally as 604. A second set of parallel lines is indicated generally as 606. The lines 604 intersect with the lines 606. Note that the distance between the lines (i.e. pitch of channels) does not have to be the same for each set of lines. For example, the horizontal channels 604 may disposed every 10 microns, while the lines 606 may be disposed every 40 microns.

Figure 6E:
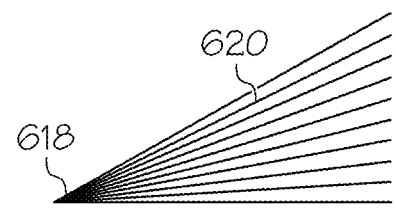
FIG. 6E shows an exemplary microgroove pattern in accordance with embodiments of the present invention.
Figure 6C:
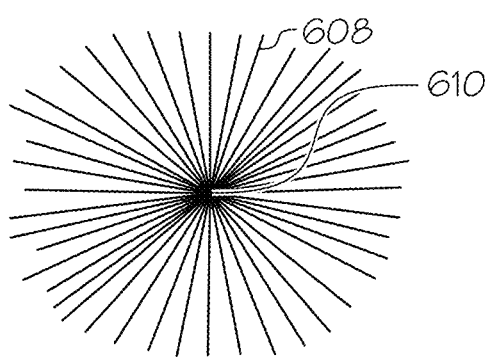
FIG. 6C shows an exemplary microgroove pattern in accordance with embodiments of the present invention.
Figure 6F:
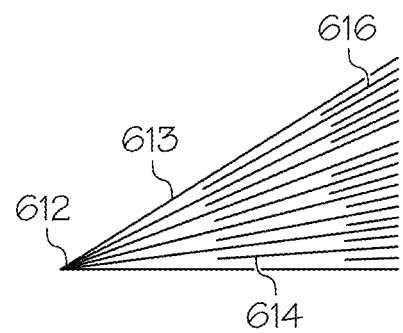
FIG. 6F shows an exemplary microgroove pattern in accordance with embodiments of the present invention.

FIG. 6C shows a radial design with a plurality of lines 608 emanating from a center point 610. FIG. 6D shows a radial design with a plurality of lines 622 emanating from a center point 624, with a plurality of concentric circles, shown generally as 626, that circumscribe the radial design. FIG. 6E shows a plurality of lines, indicated generally as 620, emanating from a point 618. FIG. 6F shows a plurality of lines, indicated generally as 613, emanating from a point 612. An additional set of lines 614 is disposed between lines 614, and an additional set of lines 616 is disposed between lines 613 and lines 614. With respect to FIGS. 6C-6F, like FIGS. 6A and 6B, the distance between the lines (i.e. channels) does not have to be equal. These patterns are merely exemplary, and other patterns may be used with embodiments of the present invention.

FIGS. 7A-7G show cross sectional views of microgroove patterns in accordance with embodiments of the present invention. In embodiments, each of the plurality of microgrooves has a height between approximately 0.05 micron and 200 microns. In embodiments, each of the plurality of microgrooves has a width between approximately 0.05 micron and 200 microns. In embodiments, a pitch of the plurality of microgrooves is between approximately. 0.05 micron and 200 microns.

Figure 7A:
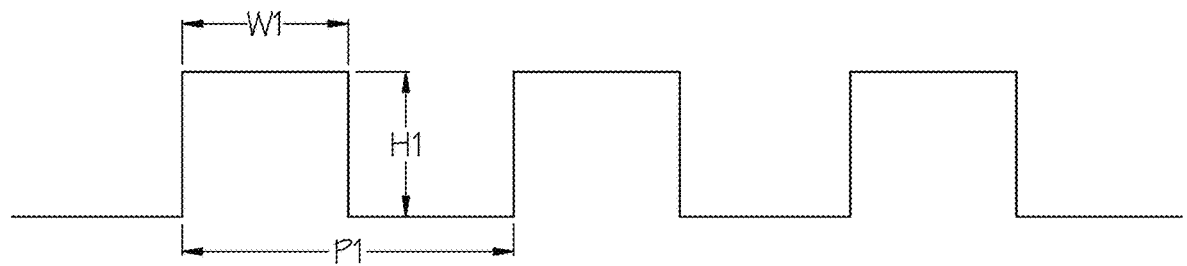
FIG. 7A shows a cross sectional view of microgroove patterns in accordance with embodiments of the present invention.

FIG. 7A shows a microgroove pattern having a pitch P1, a width W1, and a height H1. In some embodiments, H1 is equal to W1. In some embodiments, H1 is not equal to W1. In some embodiments, H1 and W1 may each range from approximately 0.05 micron to 50 microns. In some embodiments, H1 and W1 may each range from approximately 8 microns to 12 microns. In some embodiments, pitch P1 may range from approximately 0.1 micron to approximately 200 microns. In some embodiments, pitch P1 may range from approximately 8 microns to approximately 12 microns. For example, in an embodiment, H1 and W1 may each be approximately 0.1 micron, and P1 may be approximately 100 microns.

Figure 7B:
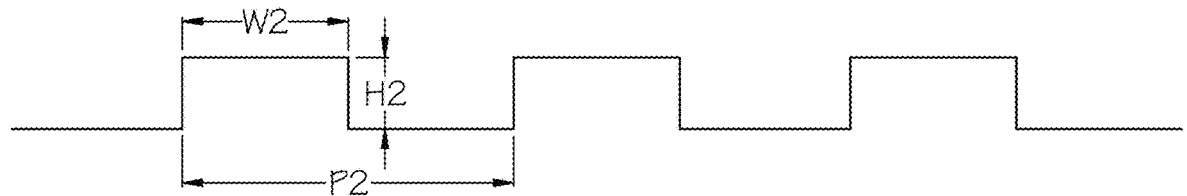
FIG. 7B shows a cross sectional view of microgroove patterns in accordance with embodiments of the present invention.

FIG. 7B shows a microgroove pattern having a pitch P2, a width W2, and a height H2. In some embodiments, H2 is one half the value of W2. H2 may range from approximately 0.05 micron to 50 microns. W2 may range from approximately 0.1 micron to approximately 50 microns. In some embodiments, H2 and W2 may each range from approximately 8 microns to 12 microns. In some embodiments, pitch P2 may range from approximately 0.1 micron to approximately 200 microns.

Figure 7C:
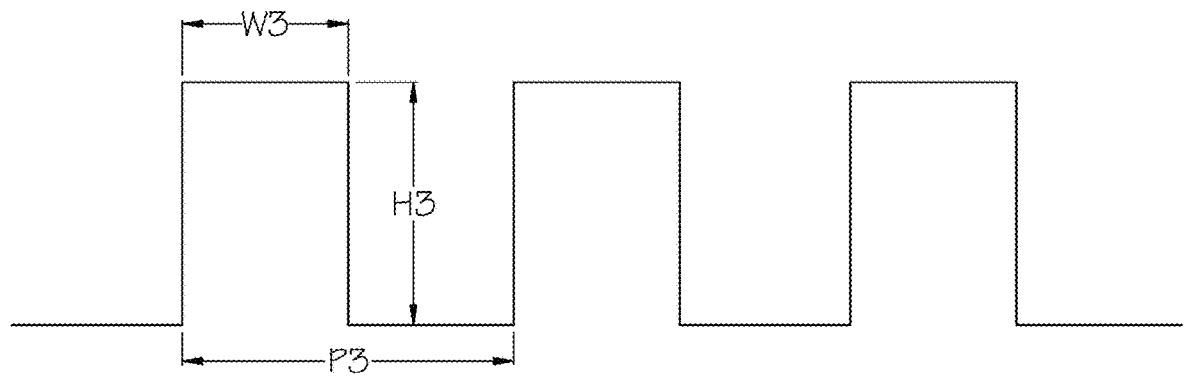
FIG. 7C shows a cross sectional view of microgroove patterns in accordance with embodiments of the present invention.

FIG. 7C shows a microgroove pattern having a pitch P3, a width W3, and a height H3. In some embodiments, H3 is twice the value of W3. In some embodiments, H3 may range from approximately 0.2 micron to approximately 200 microns. In some embodiments, W3 may range from approximately 0.1 micron to approximately 100 microns. In some embodiments, H3 and W3 may each range from approximately 8 microns to 12 microns. In some embodiments, pitch P3 may range from approximately 0.2 micron to approximately 200 microns.

Figure 7D:
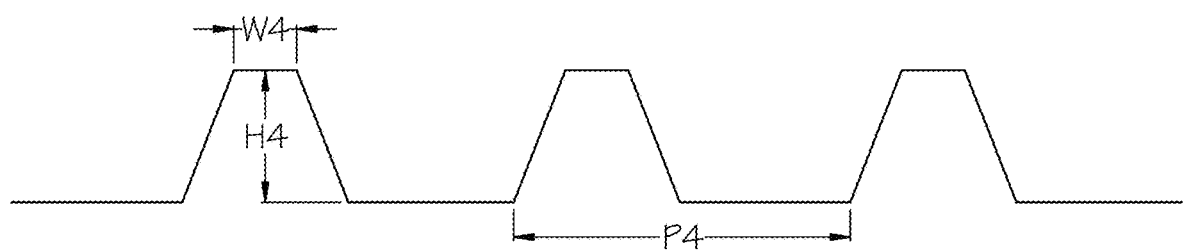
FIG. 7D shows a cross sectional view of microgroove patterns in accordance with embodiments of the present invention.

FIG. 7D shows a microgroove pattern having a pitch P4, a width W4, and a height H4. FIG. 7D shows a trapezoidal pattern. In some embodiments, H4 may range from approximately 0.05 micron to approximately 50 microns. In some embodiments, W4 may range from approximately 0.05 micron to approximately 50 microns. In some embodiments, H4 and W4 may each range from approximately 8 microns to 12 microns. In some embodiments, pitch P4 may range from approximately 0.1 micron to approximately 200 microns.

Figure 7E:
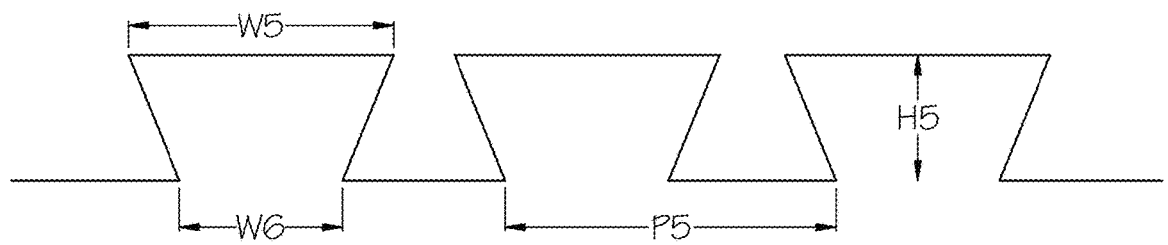
FIG. 7E shows a cross sectional view of microgroove patterns in accordance with embodiments of the present invention.

FIG. 7E shows an inverse trapezoidal pattern. FIG. 7E shows a microgroove pattern having a pitch P5, a minor width W6, a major width W5, and a height H5. In some embodiments, H5 may range from approximately 0.05 micron to approximately 50 microns. In some embodiments, W5 may range from approximately 0.1 micron to approximately 100 microns. In some embodiments, W6 may range from approximately 0.05 microns to approximately 80 microns. In some embodiments, H5, W5 and W6 may each range from approximately 8 microns to 12 microns. In some embodiments, pitch P5 may range from approximately 0.15 micron to approximately 180 microns.

Figure 7F:
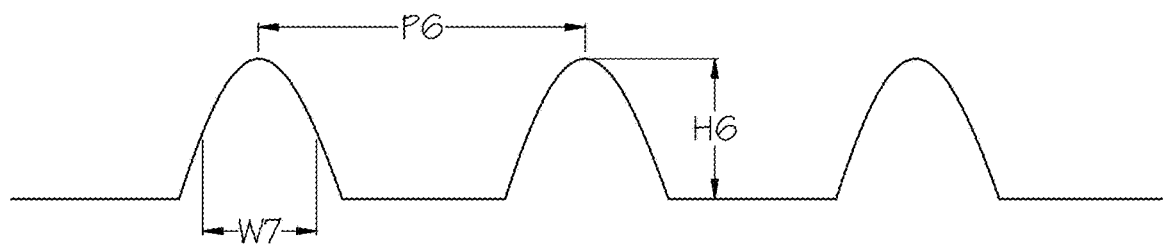
FIG. 7F shows a cross sectional view of microgroove patterns in accordance with embodiments of the present invention.

FIG. 7F shows a microgroove pattern having a pitch P6, a width W7, and a height H6. In some embodiments, H6 may range from approximately 0.05 micron to approximately 50 microns. In some embodiments, W7 may range from 5 micron to 30 microns. In some embodiments, H6 and W7 may each range from approximately 8 microns to 12 microns. In some embodiments, pitch P1 may range from approximately 0.1 micron to approximately 200 microns. In some embodiments, W7 is the width at one half of height H6.

Figure 7G:
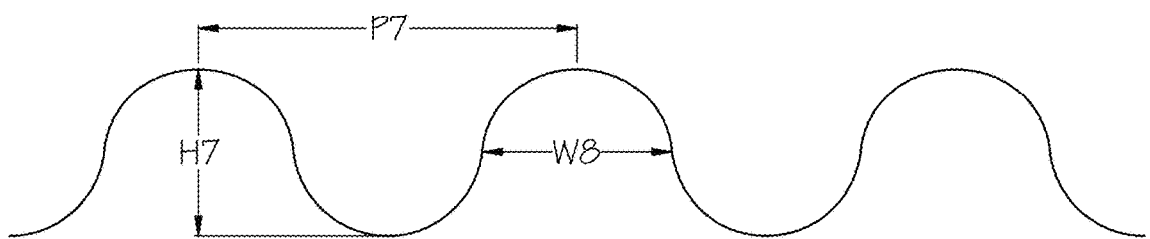
FIG. 7G shows a cross sectional view of microgroove patterns in accordance with embodiments of the present invention.

FIG. 7G shows a sinusoidal pattern. FIG. 7G shows a microgroove pattern having a pitch P7, a width W8, and a height H7. In some embodiments, H7 may range from approximately 0.05 micron to 50 microns. In some embodiments, W8 may range from approximately 0.05 micron to approximately 50 microns. In some embodiments, H8 and W8 may each range from approximately 8 microns to 12 microns. In some embodiments, pitch P7 may range from approximately 0.1 micron to approximately 200 microns. In some embodiments, W8 is the width at one half of height H7.

The composition of the tool shall be of any material that is readily able to be sterilized by a clinician in his office, typically using a moist heat sterilizer (steam autoclave). Potential materials include, but are not limited to, titanium and titanium alloys and stainless steel alloys including grades 316, 420 and 440, or polymers that can be readily sterilized such as polypropylene, polymethylpentene or polycarbonate. If the tool used to imprint the microgrooves/microtopographies is used on an implantable material, it must be clean and sterile at the time of impression. The microgrooves/microtopographies formed by the manually-operated tool of disclosed embodiments provide at least the following advantages. Cells on a flat or unorganized surface move in a random pattern. When channels are added using the tool, cell migration can be preferentially oriented along these channels in a manner that would aid in guided tissue repair by increasing cell migration velocity and enhancing re-epithelialization rates. Imprinting these microchannels onto implantable soft substrates has the potential to result in faster tissue coverage and faster healing, which can result in reduced medical costs and increased patient/clinician satisfaction.

Figure 8:
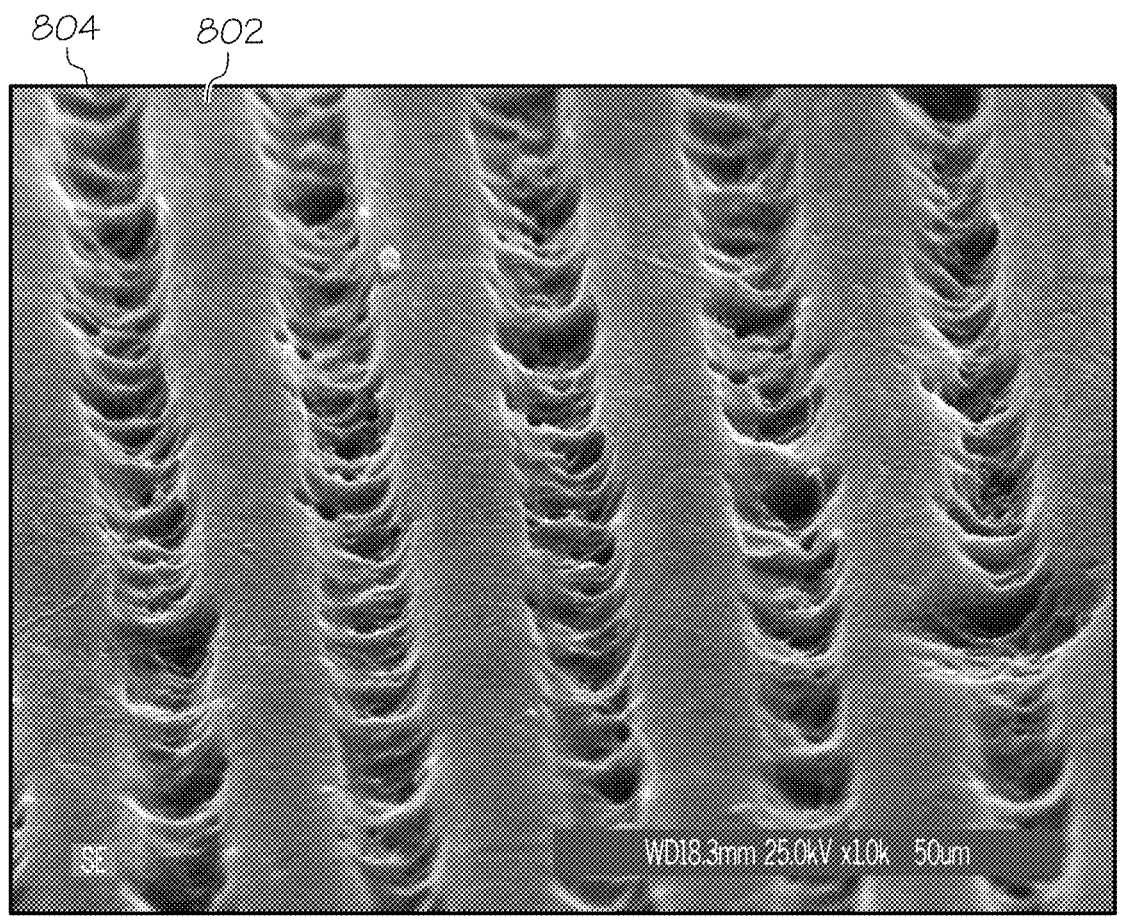
FIG. 8 shows a scanning electron microscope image of microgrooves formed by a tool in accordance with embodiments of the present invention.

FIG. 8 shows a scanning electron microscope image of microgrooves formed by a tool in accordance with embodiments of the present invention. As can be seen in FIG. 8, substrate 802 has a plurality of microgrooves 804 formed thereon by a tool having a microgroove pattern such as indicated in FIG. 6A, and having a cross section such as indicated in FIG. 7F. In some embodiments, the surface can include a micro-topographical pattern. The pattern may not necessarily be limited to grooves, but can include other patterns such as dimples, raised points or pillars, and/or other random topographies.

As can now be appreciated, disclosed embodiments provide a tool for creating microgrooves in a substrate at the time of surgical implantation. In particular, the microgroove size is selected to be in a range from 0.05 microns to 50 microns as this is generally believed to be the size range that has been shown to be impactful to cellular adhesion, orientation, migration, and differentiation. This has a variety of medical and dental applications.

Figure 9:
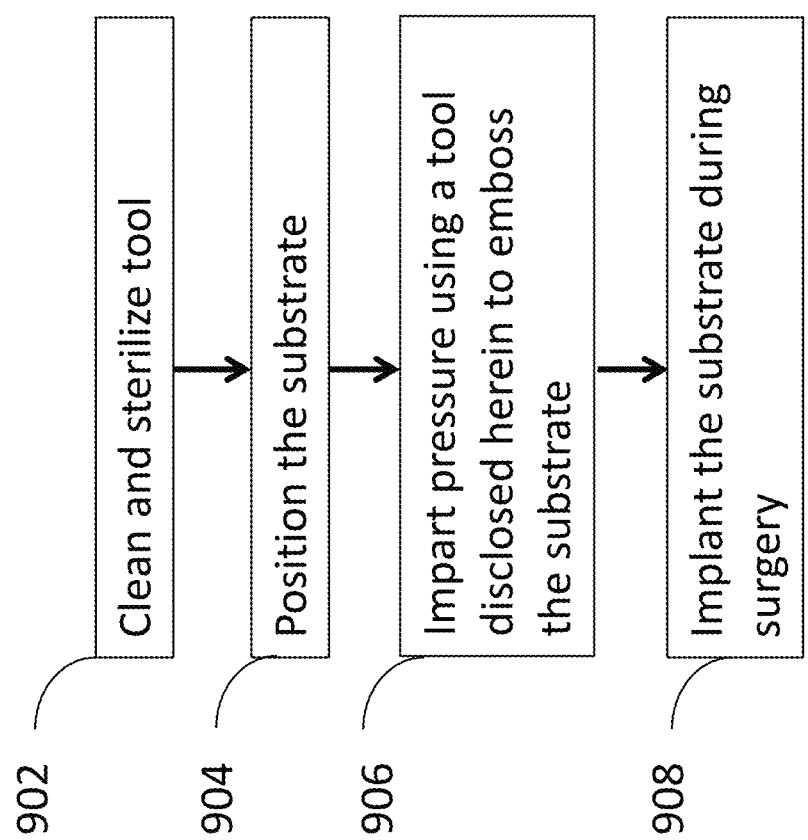
FIG. 9 shows a flowchart in accordance with some embodiments of the invention.

FIG. 9 shows a flowchart 900 in accordance with some embodiments of the invention. At 902, the tool is cleaned and sterilized. At 904, the substrate is positioned for embossing. The substrate may be positioned between two pressure plates, such as when the tools of FIGS. 1 (and 1B), 4A (and 4B and 4C), or 5 (and 5B and 5C) are used. In other embodiments, the substrate may be set out on a substantially flat surface, such as when the tools of FIGS. 2A (and 2B and 2C) or 3A (and 3B and 3C) are used. At 906, a manually-operated tool in accordance with the disclosure herein is used to impart pressure to the substrate. At 908, the substrate may then be removed and prepared and used in surgery. Additional steps may be performed before or in between these steps if determined as necessary by the clinician. The process of FIG. 9 is performed around or at the time of surgery in the clinician's office.

While the disclosure has presented exemplary embodiments, it will be appreciated that variations and modifications will occur to those skilled in the art. For example, although some of the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with the present invention. Furthermore, the methods according to the present invention may be implemented in association with the formation and/or processing of structures illustrated and described herein as well as in association with other structures not illustrated. Moreover, in particular regard to the various functions performed by the above described components, the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of the invention.

What is claimed is:

1. A manually-operated autoclavable implant embosser tool, comprising:
   a first elongated member;
   a second elongated member pivotally connected to the first elongated member;
   a first pressure plate disposed on a distal end of the first elongated member;
   a second pressure plate disposed on a distal end of the second elongated member;
   wherein the first pressure plate comprises a surface comprising a first plurality of microgrooves or microtopographies,
   wherein each of the first plurality of microgrooves has a first height, a first width, and a first pitch, and
   wherein the first height, the first width, and the first pitch are selected to orient cells in a manner that will enhance re-epithelialization rates, direct cellular orientation and migration, and increase cell migration velocity after surgical implantation of an implant embossed by the manually-operated autoclavable implant embosser;
   comprising a first finger loop disposed on the first elongated member and a second finger loop disposed on the second elongated member;
   wherein the first height is between 8 and 12 micron and the first width is between 8 and 12 micron.

2. The tool of claim 1, wherein the second pressure plate comprises a surface comprising a second plurality of microgrooves;
   wherein each of the second plurality of microgrooves has a second height, a second width, and a second pitch, and
   wherein the second height, the second width, and the second pitch are selected to orient cells in a manner that will enhance re-epithelialization rates, direct cellular orientation and migration, and increase cell migration velocity after surgical implantation of the implant embossed by the manually-operated autoclavable implant embosser.

3. The tool of claim 1, wherein the plurality of microgrooves are arranged in a pattern of parallel lines.

4. The tool of claim 2, wherein the first plurality of microgrooves are arranged in a pattern consisting of a first set of parallel lines intersecting with a second set of parallel lines of the second plurality of microgrooves.

5. The implant embosser of claim 2, wherein the first plurality of microgrooves is selected for soft tissue repair, and wherein the second plurality of microgrooves is selected for bone growth.

6. The tool of claim 1, wherein the first plurality of microgrooves are arranged in a pattern of concentric circles.

7. The tool of claim 6, wherein the pattern further comprises a plurality of lines emanating from a center point of the concentric circles.

8. The tool of claim 1, wherein the surface comprises titanium.

9. The tool of claim 1, wherein the surface comprises stainless steel.

10. The tool of claim 1, wherein the plurality of microgrooves are arranged in a pattern.

11. The tool of claim 1, wherein the surface comprises metal.

12. The implant embosser of claim 1, wherein the second height is between 0.5 micron and 50 micron and the second width is between 0.05 micron and 50 micron.

13. The implant embosser of claim 1, wherein the second height is between 8 micron and 12 micron and the second width is between 8 micron and 12 micron.

* * * * *